Jan. 15, 1946. W. W. CAMP 2,392,807
BEARING ASSEMBLY
Filed April 24, 1944

Inventor:
WILLIAM W. CAMP,
by: John E. Jackson
his Attorney.

Patented Jan. 15, 1946

2,392,807

UNITED STATES PATENT OFFICE 2,392,807

BEARING ASSEMBLY

William W. Camp, Crown Point, Ind.

Application April 24, 1944, Serial No. 532,436

2 Claims. (Cl. 80—1)

This invention relates to bearing assemblies and is particularly concerned with the problem encountered in keeping water, mill scale, etc., away from the roll necks and bearing surfaces of the upwardly facing partial bearings of steel hot rolling mills.

A specific example of the invention is illustrated by the accompanying drawing in which.

Figure 1:
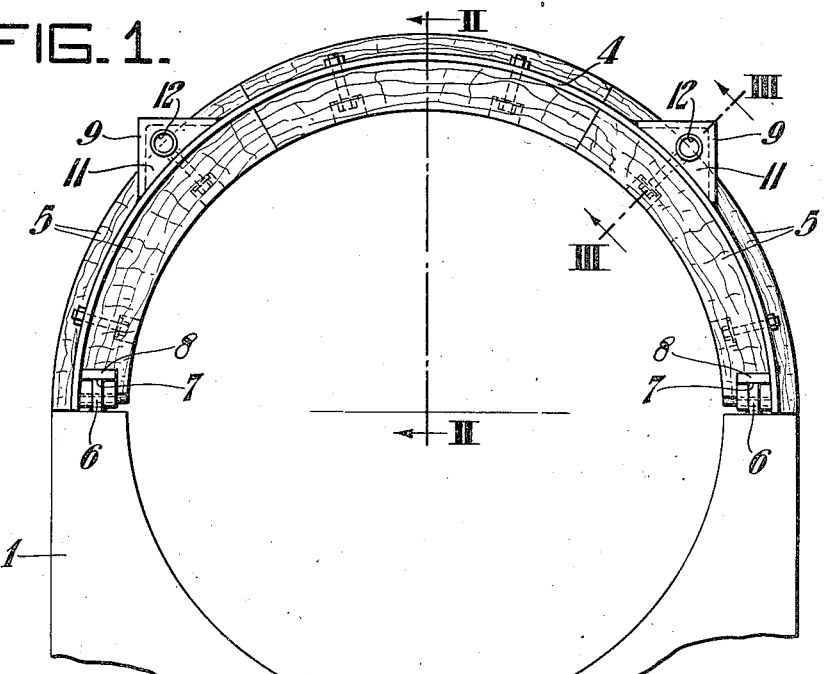
Figure 1 is an end view.
Figure 2:
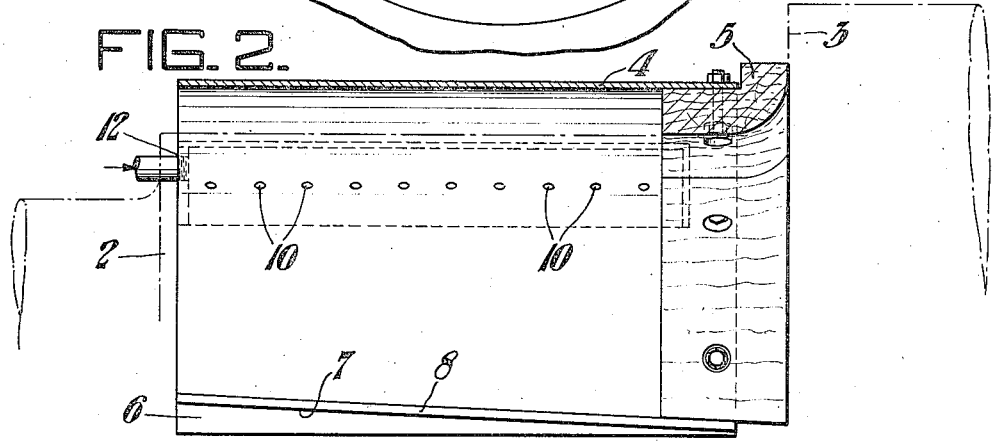
Figure 2 is a vertical longitudinal section taken from the line II—II in Figure 1.
Figure 3:
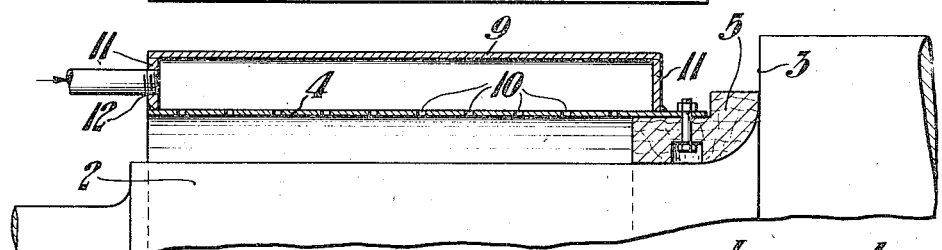
Figure 3 is a 45° longitudinal section taken from the line III—III in Figure 1.

More specifically, the drawing shows an upwardly facing partial bearing 1, which is one of the lower roll neck bearings of a steel hot rolling mill, and a rotative part having a journal 2 riding in the bearing 1 and a radial abutment 3 adjacent the bearing and rotating with the part, the part being a lower roll of the mill with the journal 2 being the neck and the abutment 3 being provided by the end of the roll body. In the operation of a rolling mill considerable water, mill scale, etc., drops onto the exposed portion of the journal 2 so that it is carried into the seat of the partial bearing 1, and covers of some sort or another are usually provided to prevent this. However, the covers of the prior art have not been efficacious.

According to the present invention, the cover is in the form of a rolled steel plate bent into a semi-cylindrical form 4, with a radius somewhat greater than that of the journal 2, and is intended to rest loosely on the top of the partial bearing 1 so as to cover the exposed journal portion. One end of the cover carries a seal 5 which is bolted to this end of the cover and which has an end contour conforming to the contour of the junction between the roll neck and body so that it may work against the abutment 3. This seal may be made from a suitable shaped piece of wood or other material capable of working as a seal. Walls 6 are provided by plates welded to the top edges of the bearing 1 longitudinally thereof and so as to extend the length of the bearing, these walls functioning as dams, preventing the flow of water, mill scale, etc., to the exposed portion of the journal or the bearing seat, and having top edges 7 declining toward the abutment 3, which is toward the roll body, and which form cam surfaces. The bottom edges of these walls 6 are horizontal as illustrated because all conventional bearings of the type here involved have horizontal top edges. These cam surfaces 7 are cooperated with by cam followers in the form of plates 8 horizontally welded lengthwise of the cover 4 to the inside of the latter near its bottom edges which straddle the journal 2, these plates 8 declining toward the abutment 3 lengthwise of the cover so as to conform with the declination of the cam surfaces 7. With this arrangement, the weight of the cover 4 urges it to slide toward the abutment with the seal 5 pressed thereagainst with a gentle but firm pressure. This feature, in conjunction with the damming action of the plates 6, serves to positively prevent the entrance of contamination into the inside of the cover, it being understood that the outside end of the cover needs no protection since there is no water or mill scale splashing about in that locality. The sides of the cover depend outside of the plates or walls 6 to form skirts shielding the cam surfaces 7.

Rolled steel angle bars 9 are welded to the outside of the cover 4, in parallel fashion respecting the same, to provide lengthwise manifolds, the wall of the cover being perforated at these manifolds, as at 10, and plates 11 being welded to the angle bar ends to close these manifolds, one of these plates 11 in each instance having an entrance 12 for fluid, such as lubricant or clean water, whereby this fluid may be fed to the journal.

I claim:

1. The combination of an upwardly facing metal rolling mill roll neck partial bearing having horizontal top edges, a metal plate bent into a semi-cylindrical form to provide a cover for resting loosely on the top of said bearing, a seal removably fastened to the end of said cover with an end contour conforming to the shape of the roll body of the roll journaled by said bearing and which seal is made of wood and the like, vertical plates welded to said top edges of said bearing longitudinally thereof and so as to extend the length of said bearing and having top edges declining toward the roll body end of said bearing, said cover straddling said bearing with its bottom edges outside said plates and depending below said top edges thereof, and horizontal plates welded inside said cover adjacent but above its bottom edges and declining with the top edges of said vertical plates and sliding thereon under the cover weight.

2. The combination of an upwardly facing metal rolling mill roll neck partial bearing having horizontal top edges, a metal plate bent into a semi-cylindrical form to provide a cover for resting loosely on the top of said bearing, a seal removably fastened to the end of said cover with an end contour conforming to the shape of the roll body of the roll journaled by said bearing and which seal is made of wood and the like, vertical plates welded to said top edges of said bearing longitudinally thereof and so as to extend the length of said bearing and having top edges declining toward the roll body end of said bearing, said cover straddling said bearing with its bottom edges outside said plates and depending below said top edges thereof, and horizontal plates welded inside said cover adjacent but above its bottom edges and declining with the top edges of said vertical plates and sliding thereon under the cover weight, said combination further including at least one angle bar welded to the outside of said cover longitudinally thereof and facing toward the same to provide a passage, and plates welded to the ends of said angle bar to close said passage with one of the same provided with an inlet, said cover being perforated in line with said angle bar so said passage opens to the roll neck of the roll journaled by said bearing.

WILLIAM W. CAMP.